United States Patent [19]

Guzy

[11] 4,234,758
[45] Nov. 18, 1980

[54] CABLE SPLICE
[75] Inventor: Raymond L. Guzy, Morton Grove, Ill.
[73] Assignee: Borg-Warner Corporation, Chicago, Ill.
[21] Appl. No.: 957,383
[22] Filed: Nov. 3, 1978
[51] Int. Cl.³ .............................................. H02G 15/08
[52] U.S. Cl. .............................. 174/84 R; 174/DIG. 8
[58] Field of Search ............ 174/84 R, 88 R, DIG. 8; 156/49

[56] References Cited
U.S. PATENT DOCUMENTS

| | | | |
|---|---|---|---|
| 3,035,113 | 5/1962 | Danchuk | 174/74 |
| 3,095,468 | 6/1963 | Klein | 174/88 R |
| 3,127,291 | 3/1964 | Betz et al. | 156/49 |
| 3,187,088 | 6/1965 | Warner | 174/91 |
| 3,691,505 | 9/1972 | Graves | 174/88 R X |
| 3,717,717 | 2/1973 | Cunningham et al. | 174/88 R X |
| 3,781,458 | 12/1973 | May | 174/84 C |
| 3,783,057 | 1/1974 | McNerney | 156/49 |
| 4,084,307 | 4/1978 | Schultz et al. | 156/49 X |

*Primary Examiner*—Roy N. Envall, Jr.
*Attorney, Agent, or Firm*—Richard J. Schlott

[57] ABSTRACT

A cable splice comprising a metallic sleeve member joining the conductor ends, a layer of adhesive over the sleeve member and adjacent insulation, a helically-wrapped insulation layer formed of a thermosetting polymer, an overlapped layer of fabric surrounding the insulation layer, a helically-wrapped heat-shrinkable tape layer surrounding the fabric layer and a heat-shrinkable sleeve surrounding the splice area which resists depressurization failure when employed in high pressure gassy oil wells, and a method for forming said cable splice.

7 Claims, 2 Drawing Figures

U.S. Patent   Nov. 18, 1980   4,234,758
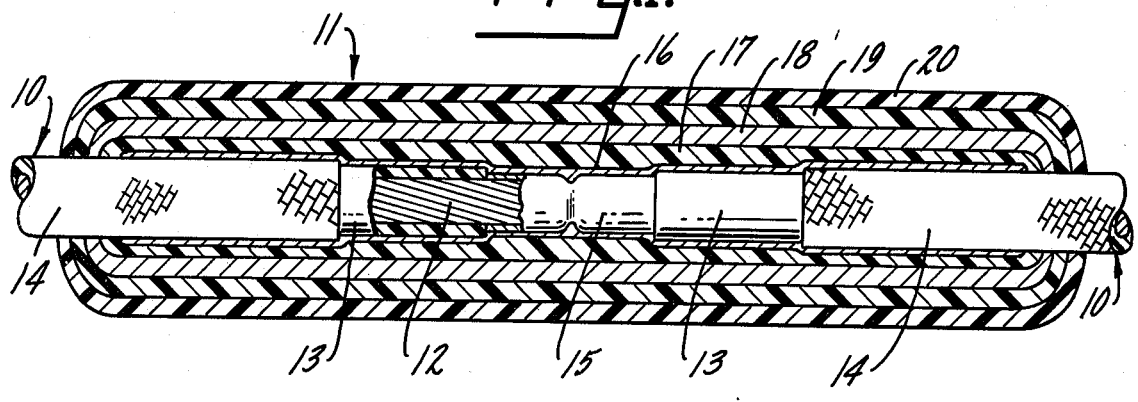
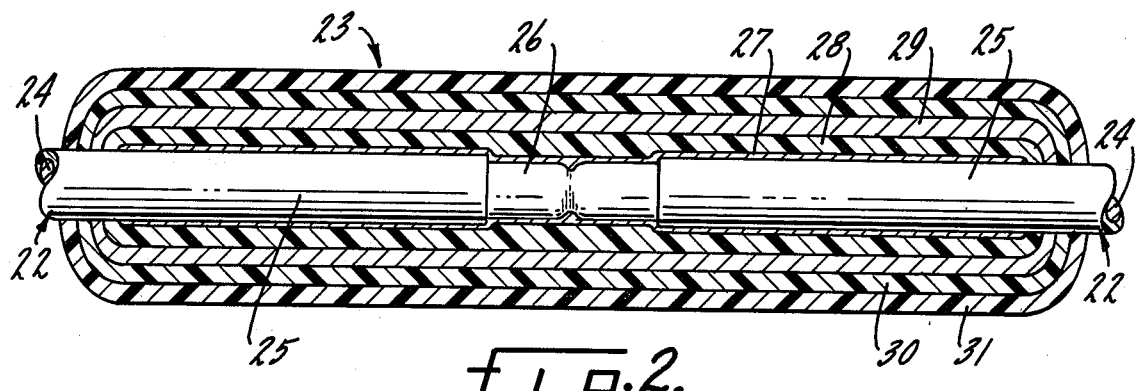

CABLE SPLICE

BACKGROUND OF THE INVENTION

This invention relates to a cable splice for an electrical cable and to a method for making a cable splice. More particularly, this invention relates to a cable splice for use in high temperature, high pressure gassy oil wells adapted to prevent depressurization-caused rupture failures, and to a method for making said cable splices.

In general, cable structures employed for oil well service have stranded metallic conductors, usually formed of copper, separately insulated with a material of high dielectric strength, cabled and surrounded by an outer armor. In joining cable sections, a splice is formed between the conductors comprising a metallic member frictionally engaging the conductors and a section of insulant surrounding the exposed ends of the conductors and the metallic member which forms the primary insulation of the splice. The section of insulant typically is formed by a plurality of layers of insulating tape, and may be surrounded and confined by a heat shrinkable sleeve positioned over the primary insulation and extending over the adjacent insulation to seal the splice area.

Where the well cable is to be employed in particularly gassy wells, invasion of the splice area by low molecular weight well fluids under high pressure occurs either by way of pinholes or other defects in the primary insulation of the splice or by gas permeation. When the cable is removed from the well bore, the external pressure is decreased creating an unbalanced high pressure condition within the splice structure, due to the presence of low molecular weight hydrocarbons. Mechanical destruction of the splice insulation by blow-out or rupture failure often results.

SUMMARY OF THE INVENTION

This invention provides a cable splice that is resistant to blow-out and rupture failure, and a method for making said cable splice. More particularly, this invention provides a cable splice having an adhesive layer, an insulation layer formed of a thermosetting elastomeric polymer having a limited degree of porosity, a fabric layer which surrounds and confines the insulation layer and two layers of heat-shrinkable polymer, and a method for splicing an insulating an electrical cable.

The cable conductors to be joined through the splice of this invention will typically comprise a stranded conductor, and an insulation layer surrounding the conductors. A fiber braid surrounding and tightly confining the insulation layer may also be included. To form the splice the conductors are trimmed to expose undamaged ends, the braid layer, if present, is trimmed to expose a portion of the primary insulation and the exposed insulation is scraped or buffed to remove dirt and roughen the surfaces. The exposed conductor ends are joined by conventional means such as with a deformable metallic sleeve, and the metallic sleeve, any remaining exposed area of the conductors, the insulation and a portion of the braid layer, if present, is coated with an adhesive. Insulating tape formed of a thermosetting elastomeric polymer is then helically wound over the exposed insulation and conductors. An elongated strip of fabric is applied over the braided portions and splice area in overlapped relationship and is optionally secured by application of an adhesive to the end portions and lap area. The fabric is then covered with a helically-wound layer of heat-shrinkable tape, and a sleeve member formed of heat-shrinkable tubing is positioned to extend over splice area including any braid-covered portions. Heat sufficient to shrink the heat-shrinkable tape and tubing is then applied to compress and secure the insulation and fabric layers.

The splice made in accordance with this invention is suitable for service when immersed in and surrounded by well fluids under high temperatures and pressures, and is not susceptable to depressurization failure. Where minor amounts of low molecular weight well fluids permeate the somewhat porous insulation layer, the fabric restrains the insulation layer against swell and rupture from high internal pressure, and the low molecular weight well fluids desorb without rupture or damage to the insulation.

DESCRIPTION OF THE DRAWINGS

FIG. 1 is a side view in partial section showing a pair of cable ends joined through a cable splice.

FIG. 2 is a side view in partial section showing an alternative embodiment of the cable splice of this invention.

DESCRIPTION OF THE PREFERRED EMBODIMENTS

Referring now to the drawings, there is shown in FIG. 1 a pair of cable ends 10 which have metallic conductors 12 covered with insulation 13 and braid layer 14. An example of an insulated and braid wrapped conductor suitable for use in gassy oil wells is more fully described in U.S. Pat. No. 4,096,351. The cable ends 10 are joined through cable splice 11, comprising a metallic sleeve 15, adhesive layer 16, insulating tape layer 17, fabric layer 18, heat-shrinkable polymeric tape layer 19 and heat-shrinkable sleeve layer 20.

In forming a cable splice according to the instant invention, cable ends 10 are trimmed to remove a section of the insulation to expose lengths of the conductors 12, and further trimmed to remove a section of braid layer to expose lengths of the insulation 13. The exposed conductors are joined by inserting in a metallic sleeve 15, which is then deformed to frictionally engage the conductors.

Any exposed areas of the conductors, the metallic sleeve, the exposed areas of the insulation and preferably a portion of the braid are then coated with an adhesive 16. Adhesives suitable for the purposes of this invention generally are liquid, preferably solvent-free, adhesives such as, for example, liquid epoxy resins, liquid urethanes, and the like, which cure without heat to form a strong, flexible, water-and oil-impervious bond. The adhesive serves to form a tight bond between the metallic sleeve and cable insulation and the insulating tape layer subsequently applied over the adhesive layer.

One or more layers of insulating tape 17 is then applied over the adhesive layer in the splice area with a helical wrap to cover the exposed insulation, any remaining exposed conductor area and the metallic sleeve. In general, it will be desirable to first apply sufficient insulating tape over the metallic sleeve area to fill the area to the level of the adjacent cable insulation, then to complete the layer with a single helical wrap extending over the exposed insulation at each end. The insulating tape is formed of a thermosetting elastomeric polymer which, when cured, is an excellent electrical insulator at elevated temperatures and virtually impervious to attack by oil and other well fluids. An essential property of the polymer is a limited degree of porosity in that it is capable of imbibing very low molecular weight hydrocarbons when under high pressure and then readily desorbing the imbibed gassy hydrocarbons when external pressure is removed. One such material useful for these purposes is a modified EPDM (ethylene-propylene-diene monomer terpolymer) blend such as is disclosed in U.S. Pat. No. 3,926,900. When employed for the purposes of this invention in the form of an insulating tape, the polymer is uncured, the requisite curing being carried out when construction of the splice is completed.

Over the layer of insulating tape is placed a single wrap of fabric 18, extending over a portion of the confining braid. Preferably the fabric will be applied in the form of an elongated strip wrapped to overlap along the length of the splice. Fabric 18 may alternatively be applied in the form of a fabric tape helically wound along the length of the splice and extending over a portion of the confining braid. A number of woven fabric materials may be used for the purposes of this invention including, for example, nylon, polyester, rayon, cotton, fabrics formed from glass filament or fiber and the like. It is essential that the fabric withstand exposure to the well fluids without degradation or substantial loss in tensile strength. A liquid adhesive may be applied to the lap area and to end areas in contact with the braid.

Over the fabric is applied a single, helically-wound tape layer 19 formed of heat-shrinkable polymeric material such as PTFE, PFE and the like.

A sleeve 20 of heat-shrinkable tubing is then positioned to surround the splice area, extending over a portion of the braid at both ends of the splice area. Heat is then applied to the entire splice to shrink the sleeve 20 and the heat-shrinkable tape layer 19, thus compressing and tightly confining the insulation and fabric layers. Multiple wraps of heat-shrinkable tape are to be avoided. For the purposes of this invention, the combination of the heat-shrinkable tape and sleeve are intended only to confine and compress the insulation and fabric layers, and not to form a complete seal against the escape of desorbed gassy hydrocarbons.

The splice may then be further heated to effect curing of the insulation layer. This curing step is optional in-as-much-as the temperatures encountered in service in most well-bore applications will quickly effect the requisite curing.

EXAMPLE 1.

A splice was constructed according to the principles set forth above, employing nylon fabric as the fabric layer, PFE to form the heat-shrinkable tape layer and PFE heat-shrinkable tubing to form the sleeve layers, and cured at 325°-350° F. The splice was placed in a gassy oil well for six weeks. On removal from the well, the cable was dissected and the splice examined. No rupture or blow-out had occurred.

EXAMPLE 2

A splice was constructed for comparison purposes essentially according to the principles set forth above, as in Example 1, but the fabric layer was omitted. After exposure to a gassy oil well environment for three weeks, upon subsequent removal the splice had ballooned and ruptured. It will thus be apparent that the fabric layer effectively confines the insulation layer preventing blow-outs and constraining the gaseous hydrocarbons to escape from the porous insulation by a desorbtion process.

EXAMPLE 3

A splice was constructed for comparison purposes essentially according to the principles of this invention as in Example 1, but employing a conventional ethylene-propylene rubber insulating tape to form the insulating layer. After exposure to a gassy oil well environment for three weeks, the splice was removed. The splice was ruptured, demonstrating that the combination of a fabric layer and a non-porous insulation layer are inadequate in that the fluids trapped within a non-porous elastomeric insulation cannot desorb, and thus exert stresses sufficiently great to rupture the fabric layer and destroy the splice insulation.

The practice of this invention is not restricted to cable ends of the type shown in FIG. 1.

It will be understood that the cable splice of the instant invention may be employed to join insulated conductors having structures other than those shown in FIG. 1. An alternative embodiment of the cable splice of this invention is shown in FIG. 2, wherein the splice 23 is formed between a pair of conventional well cable ends 22 which have only metallic conductors 24, each covered with an insulation layer 25. The insulation layer 25 may be formed of any of the commonly employed insulation materials such as nitrile rubber, polypropylene, and the like. The cable splice, formed as described herein above, includes metallic sleeve 26, surrounded by adhesive layer 27 which extends over the exposed conductor and insulation, helically-wrapped insulation tape layer 28, fabric layer 29, helically-wrapped heat-shrinkable tape layer 30 and the heat-shrinkable sleeve 31.

It will also be apparent that the cable splice of this invention may be employed to join cable ends of differing constructions such as for example an insulated braid wrapped conductor such as is shown in FIG. 1 with an insulated conductor of the type shown in FIG. 2.

The invention will thus be seen to be a cable splice and a method for forming a cable splice.

I claim:

1. A cable splice comprising a metallic sleeve member extending over conductor end portions and frictionally engaging the conductor end portions;
   a layer of adhesive covering said sleeve member and extending over the exposed cable insulation;
   an insulation layer of uncured thermosetting elastomeric polymer tape surrounding the layer of adhesive in a helical wrap;
   an overlapped layer of fabric surrounding said insulation layer;
   a helically-wrapped layer of heat-shrinkable polymeric material tape surrounding said layer of fabric, and
   a sleeve of heat shrinkable polymeric material surrounding the layer of heat shrinkable polymeric material tape.

2. The cable splice of claim 1 wherein the fabric layer end portions and lap area are coated with an adhesive.

3. The cable splice of claim 1 wherein the thermosetting elastomeric polymer tape is cured by a thermal post-treatment.

4. A method for forming a cable splice comprising the steps of joining the exposed conductor ends with sleeve means frictionally engaging said conductor ends;

coating the sleeve means, the exposed conductor ends and the exposed insulation with a liquid adhesive;

applying an insulation layer of uncured thermosetting elastomeric polymer tape over the adhesive coating in a helical wrap;

applying an overlapping layer of fabric to surround said insulation layer;

applying a layer of heat-shrinkable polymeric material tape in a helical wrap; and positioning a sleeve of heat-shrinkable polymeric material to surround the layer of heat-shrinkable tape.

5. The method of claim 4 wherein the layer of fabric is coated in the end and overlap areas with an adhesive.

6. The method of claim 4 further comprising the step of thermally-treating the splice to shrink the heat-shrinkable materials.

7. The method of claim 6 further comprising the step of thermally-treating the splice to cure the thermosetting elastomeric polymer.

* * * * *

UNITED STATES PATENT OFFICE
CERTIFICATE OF CORRECTION

Patent No. 4,234,758   Dated November 18, 1980

Inventor(s) RAYMOND L. GUZY

It is certified that error appears in the above-identified patent and that said Letters Patent are hereby corrected as shown below:

[73] Assignee is changed to -- Centrilift-Hughes, Inc., Claremore, Oklahoma 74017 --.

Signed and Sealed this

*Nineteenth* Day of *May 1981*

[SEAL]

*Attest:*

RENE D. TEGTMEYER

*Attesting Officer*   *Acting Commissioner of Patents and Trademarks*